United States Patent
Wen et al.

(10) Patent No.: US 12,401,213 B2
(45) Date of Patent: Aug. 26, 2025

(54) CHARGING CIRCUIT AND CHARGING DEVICE

(71) Applicant: Nanjing Silergy Micro Technology Co., Ltd., Nanjing (CN)

(72) Inventors: Sihua Wen, Nanjing (CN); Zhao Lu, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 820 days.

(21) Appl. No.: 17/688,011

(22) Filed: Mar. 7, 2022

(65) Prior Publication Data

US 2022/0302732 A1 Sep. 22, 2022

(30) Foreign Application Priority Data

Mar. 19, 2021 (CN) .......................... 202120575127.1

(51) Int. Cl.
*H02J 7/00* (2006.01)
*H02M 1/00* (2006.01)
*H02M 3/07* (2006.01)

(52) U.S. Cl.
CPC ....... *H02J 7/00712* (2020.01); *H02M 1/0045* (2021.05); *H02M 3/07* (2013.01); *H02J 2207/20* (2020.01)

(58) Field of Classification Search
USPC ........................................................ 320/160
See application file for complete search history.

(56) References Cited

U.S. PATENT DOCUMENTS

| | | | |
|---|---|---|---|
| 3,767,994 A * | 10/1973 | Dittmar | H02J 7/007182 320/141 |
| 6,005,780 A | 12/1999 | Hua | |
| 6,144,187 A * | 11/2000 | Bryson | H02J 7/0068 320/164 |
| 6,580,258 B2 | 6/2003 | Wilcox et al. | |
| 9,325,254 B2 | 4/2016 | Deng et al. | |
| 9,331,588 B2 | 5/2016 | Chen | |
| 9,488,680 B2 | 11/2016 | Xu | |
| 2008/0042622 A1* | 2/2008 | Wong | H02J 7/0069 320/162 |
| 2009/0085538 A1* | 4/2009 | Miguchi | H02M 3/07 323/273 |
| 2010/0133916 A1* | 6/2010 | Sato | H02J 50/10 320/108 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |

* cited by examiner

*Primary Examiner* — Samuel Berhanu

(57) ABSTRACT

A charging circuit can include: a linear regulator configured to receive an external input source; a charge pump coupled between the linear regulator and a charging terminal, where the charging terminal is coupled to a battery; and a control circuit configured to generate a first control signal according to a current sampling signal representing a charging current of the battery and a voltage sampling signal representing a charging voltage of the battery, in order to control the linear regulator, such that at least one of the charging current and the charging voltage meet charging requirements.

18 Claims, 14 Drawing Sheets

CHARGING CIRCUIT AND CHARGING DEVICE

RELATED APPLICATIONS

This application claims the benefit of Chinese Patent Application No. 202120575127.1, filed on Mar. 19, 2021, which is incorporated herein by reference in its entirety.

FIELD OF THE INVENTION

The present invention generally relates to the field of power electronics, and more particularly to charging circuits and devices.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Many electronic devices require rechargeable batteries to power them, and these devices often require a charger for charging. At present, a commonly used charger is a linear charger. A linear charger can adjust the charging current and the charging voltage to charge the battery, and has advantages of relatively small size and low cost. However, the large difference between the input voltage and the charging voltage of the battery causes a large power loss in the linear charger. Usually, since the input voltage provided by the input power supply is much higher than the charging voltage required by the battery, a buck circuit can be used in the charger to step down the input voltage, and the step-down voltage can charge the battery. However, the buck charger requires an inductor, which increases area and cost, and may still not be adequate for many space-constrained applications.

Figure 1:
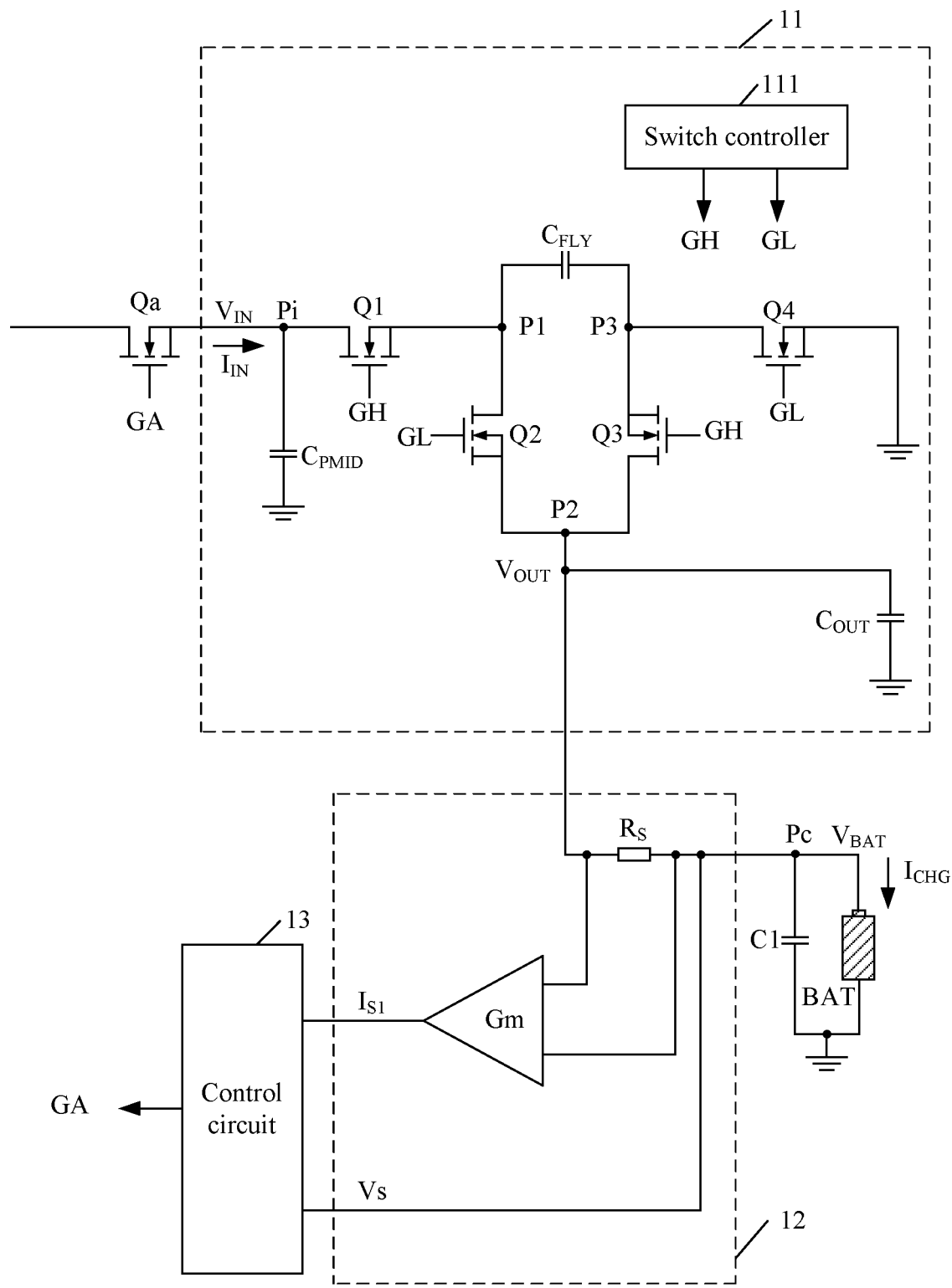
FIG. 1 is a schematic circuit diagram of a first example charging circuit, in accordance with embodiments of the preset invention.

Referring now to FIG. 1, shown is a schematic circuit diagram of a first example charging circuit, in accordance with embodiments of the preset invention. In this particular example, the charging circuit can include linear regulator Qa, charge pump 11, signal sampling circuit 12, and control circuit 13. For example, linear regulator Qa may receive an external input source and convert an output signal of the external input source into the input voltage or input current required by charge pump 11. Charge pump 11 can connect between linear regulator Qa and charging terminal Pc. Charge pump 11 can be controlled to switch on and off, such that the output voltage of charge pump 11 is 1/N of the input voltage of charge pump 11 and the output current of charge pump 11 is N times the input current of charge pump 11, where N is a positive integer greater than 1, and charging terminal Pc can connect battery BAT. Signal sampling circuit 12 can obtain a current sampling signal representing the charging current of battery BAT and a voltage sampling signal representing the charging voltage of battery BAT. Control circuit 13 can generate a first control signal according to the current sampling signal and the voltage sampling signal, and the first control signal can control linear regulator Qa. It should be understood that the charging current of battery BAT can be equal to the output current of charge pump 11, and the charging voltage of battery BAT may be equal to the output voltage of charge pump 11 (ignoring the sampling loss).

In particular embodiments, linear regulator Qa is a transistor, and the first control signal generated by control circuit 13 can control the transistor to operate in a critical saturation state to adjust the input voltage or input current required by charge pump 11. Here, transistor Qa can be a metal-oxide-semiconductor field-effect Transistor (MOSFET). It should be understood that a bipolar-junction transistor (BJT) or an insulated-gate bipolar transistor (IGBT) may also be applied in certain embodiments. Further, taking linear regulator Qa as a MOSFET as an example, when MOSFET operates in the critical saturation state, the voltage difference between the two power ends of MOSFET can be adjusted by adjusting gate-source voltage Vgs of MOSFET, such that the voltages at the two power ends of MOSFET are nearly equal. Further, the external input source may be coupled to linear regulator Qa via a rectifier circuit (e.g., the external input source is an AC source) and/or a filter circuit.

In this particular example, charge pump 11 can include capacitor $C_{PMID}$, switch Q1, switch Q2, switch Q3, switch Q4, capacitor $C_{FLY}$, capacitor $C_{OUT}$, and switch controller 111. Capacitor $C_{PMID}$ can connect between output terminal Pi of linear regulator Qa and the common terminal. Switch Q1 can connect between output terminal Pi of linear regulator Qa and terminal P1. Switch Q2 can connect between terminals P1 and P2. Switch Q3 can connect between terminals P2 and P3. Switch Q4 can connect between terminal P3 and the common terminal. Capacitor $C_{FLY}$ can connect between terminals P1 and P3. Capacitor $C_{OUT}$ can connect between terminal P2 and the common terminal. Switch controller 111 can control switches Q1, Q2, Q3, and Q4 to be turned on or off. In this example, the common terminal is a ground terminal, and terminal P2 is the output terminal of charge pump 11.

Switch controller 111 can control switches Q1 and Q3 to be turned on or off synchronously, and can control switches Q2 and Q4 to be turned on or off synchronously in an opposite manner. That is, switch controller 111 can generate switch control signals to control switches Q1-Q4, such that when switches Q1 and Q3 are controlled to be turned on synchronously, switches Q2 and Q4 are controlled to be turned off synchronously. Further, when switches Q2 and Q4 are controlled to be turned on synchronously, switches Q1 and Q3 can be controlled to be turned off synchronously.

Figure 2:
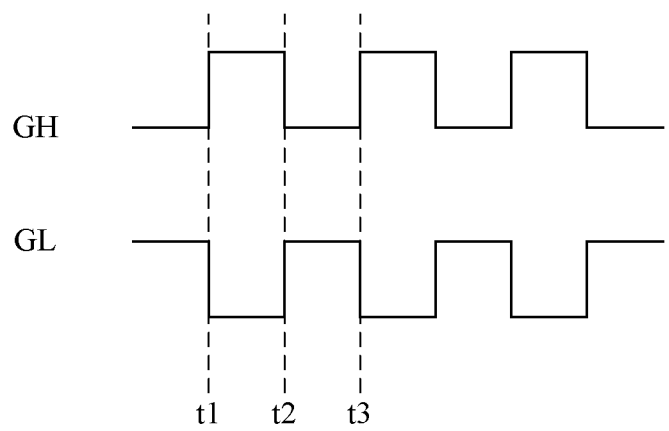
FIG. 2 is a waveform diagram of example switching control signals, in accordance with embodiments of the present invention.

Referring now to FIG. 2, shown is a waveform diagram of example switching control signals, in accordance with embodiments of the present invention. In this particular example, the switch control signals generated by switch controller 111 can include switch control signals GH and GL. For example, the phase difference between switch control signal GH and switch control signal GL is 180°, and the duty cycles of switch control signals GH and GL are 50%. In this particular example, switch control signal GH can control switches Q1 and Q3, and switch control signal GL can control switches Q2 and Q4. In other examples, switch control signal GH may control switches Q2 and Q4, and switch control signal GL may control switches Q1 and Q3. In this particular example, the duty cycles of switch control signal GH and switch control signal GL can be 50%; however, other duty cycles can also be utilized in certain embodiments.

In this particular example, capacitor C1 and battery BAT can connect in parallel to form a parallel circuit, and the parallel circuit can connect between output terminal P2 of the charge pump and the ground terminal. Further, time period t1-t3 is a control cycle. In one control cycle, switch controller 111 can control the charge pump to switch between the first state and the second state. For example, in time period t1-t2, switch controller 111 can control the charge pump to operate in the first state, and in time period t2-t3, switch controller 111 can control the charge pump to operate in the second state. Therefore, the output voltage of the charge pump can be equal to 1/N of its input voltage, the output current of the charge pump can be equal to N times its input current, whereby N is a positive integer greater than 1. In the charge pump in FIG. 1, N=2; that is, the output voltage of the charge pump is equal to half of its input voltage, and the output current of the charge pump is equal to twice its input current. In certain embodiments, the charge pump may be set correspondingly according to particular requirements, in order to obtain an appropriate voltage conversion ratio.

Figure 3:
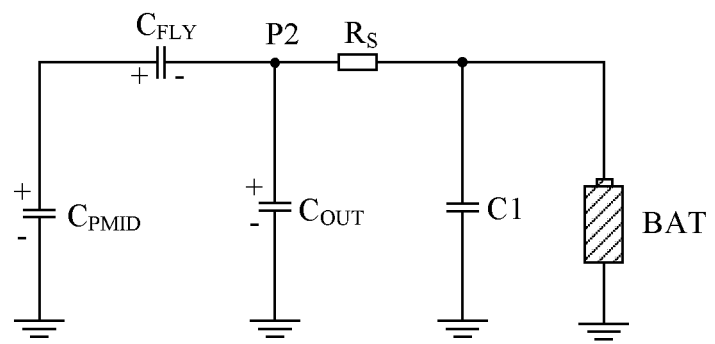
FIG. 3 is a schematic circuit diagram of an equivalent circuit for an example charge pump in a first state, in accordance with embodiments of the present invention.

For example, in time period t1-t2, switch control signal GH is at a high level, and switch control signal GL is at a low level. At this time, switches Q1 and Q3 can be turned on, switches Q2 and Q4 may be turned off, and the charge pump may operate in the first state. The equivalent circuit diagram of the charge pump can be as shown in FIG. 3. Capacitor $C_{FLY}$ and capacitor $C_{OUT}$ can connect in series to form a series circuit, and the series circuit can connect in parallel with capacitor $C_{PMID}$. The voltages of capacitors $C_{PMID}$, $C_{FLY}$, and $C_{OUT}$ may satisfy the following Formula (1).

$$V_{CPMID}=V_{CFLY}+V_{OUT} \quad (1)$$

Figure 4:
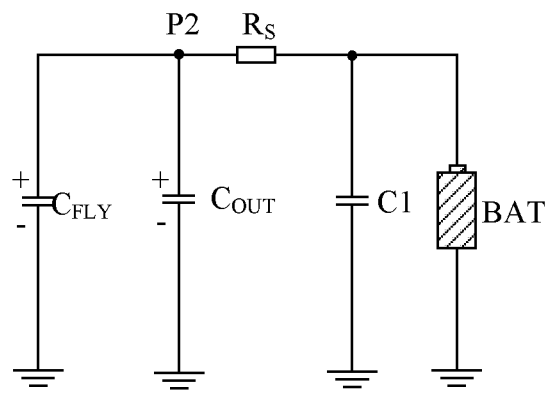
FIG. 4 is a schematic circuit diagram of an equivalent circuit for an example charge pump in a second state, in accordance with embodiments of the present invention.

For example, $V_{CPMID}$ is the voltage across capacitor $C_{PMID}$, $V_{CFLY}$ is the voltage across capacitor $C_{FLY}$, and $V_{OUT}$ is the voltage across capacitor $C_{OUT}$. During time period t2-t3, switch control signal GH can be at a low level, and switch control signal GL may be at a high level. At this time, switches Q1 and Q3 can be turned off, switches Q2 and Q4 may be turned on, and the charge pump can operate in the second state. The equivalent circuit diagram of the charge pump can be as shown in FIG. 4. Capacitor $C_{FLY}$ and capacitor $C_{OUT}$ can connect in parallel to form a parallel circuit, and the parallel circuit may be discharged to output terminal P2 of the charge pump. The voltages of capacitors $C_{FLY}$ and $C_{OUT}$ may satisfy the following formula (2).

$$V_{CFLY}=V_{OUT} \quad (2)$$

For example, $V_{CFLY}$ is the voltage across capacitor $C_{FLY}$, and $V_{OUT}$ is the output voltage of the charge pump. Further, according to the above Formulas (1) and (2), the following relationship can be obtained in Formula (3).

$$V_{IN}=V_{CFLY}+V_{OUT}=2V_{OUT} \approx 2V_{BAT} \quad (3)$$

For example, $V_{IN}$ is the input voltage of the charge pump, $V_{IN}$ is equal to voltage $V_{CPMID}$ on capacitor $C_{PMID}$, and $V_{OUT}$ is the output voltage of the charge pump. That is, the output voltage of the charge pump can be converted into half of the input voltage of the charge pump. Since sampling resistor Rs may be relatively small, it can essentially be ignored, thus obtaining $V_{OUT}=V_{BAT}$. Formula (4) can be further obtained as shown below.

$$I_{CHG}=2I_{IN} \quad (4)$$

For example, $I_{IN}$ represents the input current of the charge pump, and $I_{CHG}$ represents the charging current of battery BAT, which may be equal to the output current of the charge pump. That is, the output current of the charge pump can be converted to twice its input current. By adapting the charge pump, the charge pump may realize other conversion ratios according to actual needs. For example, if the conversion ratio is N, the output voltage of the charge pump can be one-Nth of its input voltage, and the output current of charge pump may be N times its input current, such that when the battery specification is fixed (e.g., the charging current of the battery is constant), the input current flowing through the linear regulator can be reduced, thereby reducing the power consumption of the linear regulator.

In particular embodiments, feedback control can be performed by signal sampling circuit 12 and control circuit 13. For example, signal sampling circuit 12 can include a voltage sampling circuit and a current sampling circuit. For example, the voltage sampling circuit can obtain voltage sampling signal $V_S$, voltage sampling signal $V_S$ can represent battery voltage $V_{BAT}$, and the current sampling circuit can obtain the current sampling signal. In the example charging circuit shown in FIG. 1, the current sampling circuit can obtain current sampling signal $I_{S1}$, and current sampling signal $I_{S1}$ may represent the charging current $I_{CHG}$ for charging battery BAT. For example, the output voltage of the charge pump is the voltage at terminal P2; that is, the voltage across capacitor $C_{OUT}$, which can also be equal to the battery voltage without considering the sampling loss.

The current sampling circuit can also include a sampling element and a transconductance amplifier. The sampling element can connect between terminal P2 and battery BAT, and the two input ends of the transconductance amplifier may respectively connect to two ends of the sampling element to obtain the current sampling signal according to the voltage across the two ends of the sampling element. For example, the transconductance amplifier can be an amplifier that converts an input differential voltage into an output current. As shown in FIG. 1, the sampling element is resistor $R_S$, and the non-inverting input end and the inverting input end of transconductance amplifier Gm may respectively connect to two ends of resistor $R_S$, in order to obtain the voltage difference between the two ends of resistor $R_S$, and current sampling signal $I_{S1}$ is obtained according to the voltage difference.

Control circuit 13 can control linear regulator Qa according to voltage sampling signal $V_S$ and current sampling signal $I_{S1}$, such that the battery is charged in different charging modes. For example, the charging mode can include a trickle current mode, a constant current mode, and a constant voltage mode. In the trickle current mode, the battery can be charged with constant current $I_1$. In the constant current mode, the battery can be charged with constant current $I_2$. In the constant voltage mode, the battery can be charged with a constant voltage, and current $I_1$ can be smaller than current $I_2$. Further, in the trickle current mode, the fully discharged battery can be pre-charged with a relatively small constant current, such that the battery voltage can gradually increase at a relatively slow speed. When the battery voltage rises to a pre-charging threshold, constant current mode may be entered, and the battery can be charged with a larger constant current. When the battery voltage rises to a constant voltage charging threshold, the constant current mode may end and the constant voltage mode can begin.

The specific settings can be made according to the particular battery specifications. For example, predetermined thresholds can be and $V_{M2}$ are set in advance according to battery specifications, and predetermined threshold $V_{M1}$ can be smaller than predetermined threshold $V_{M2}$, where predetermined threshold $V_{M1}$ is the pre-charging threshold, and predetermined threshold $V_{M2}$ is the constant voltage charging threshold. Therefore, battery voltage $V_{BAT}$ can be divided into three intervals according to predetermined thresholds $V_{M1}$ and $V_{M2}$: the first interval is $0 \leq V_{BAT} < V_{M1}$, the second interval is $V_{M1} \leq V_{BAT} < V_{M2}$, and the third interval is $V_{BAT} = V_{M2}$. When battery voltage $V_{BAT}$ is less than predetermined threshold $V_{M1}$, it can be determined that the charging mode of the battery is the trickle current mode. When battery voltage $V_{BAT}$ is in the interval of $V_{M1} \leq V_{BAT} < V_{M2}$, it can be determined that the charging mode of the battery is constant current mode. When battery voltage $V_{BAT}$ is equal to predetermined threshold $V_{M2}$, it can be determined that the charging mode of the battery is constant voltage mode. In the trickle current mode, the battery may be charged with constant current $I_1$. In the constant current mode, the battery can be charged with constant current $I_2$. In the constant voltage mode, the battery may be charged with a constant voltage, and current $I_1$ can be smaller than current $I_2$.

Figure 5:
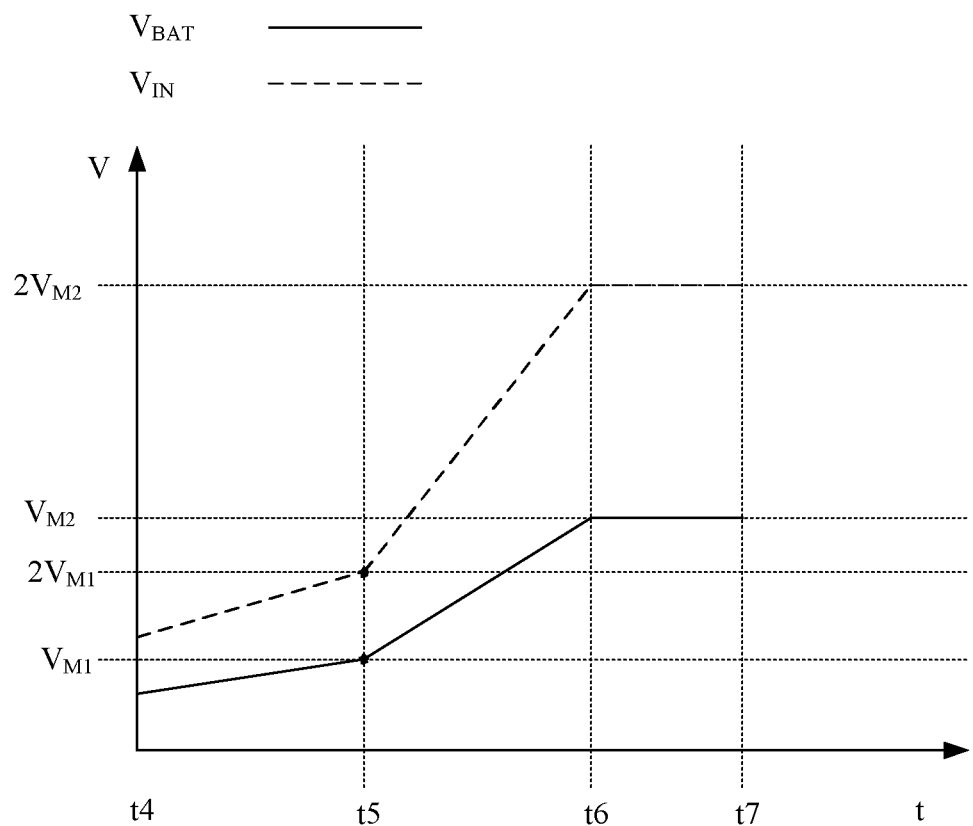
FIG. 5 is a waveform diagram of voltage in the battery charging curve, in accordance with embodiments of the present invention.
Figure 6:
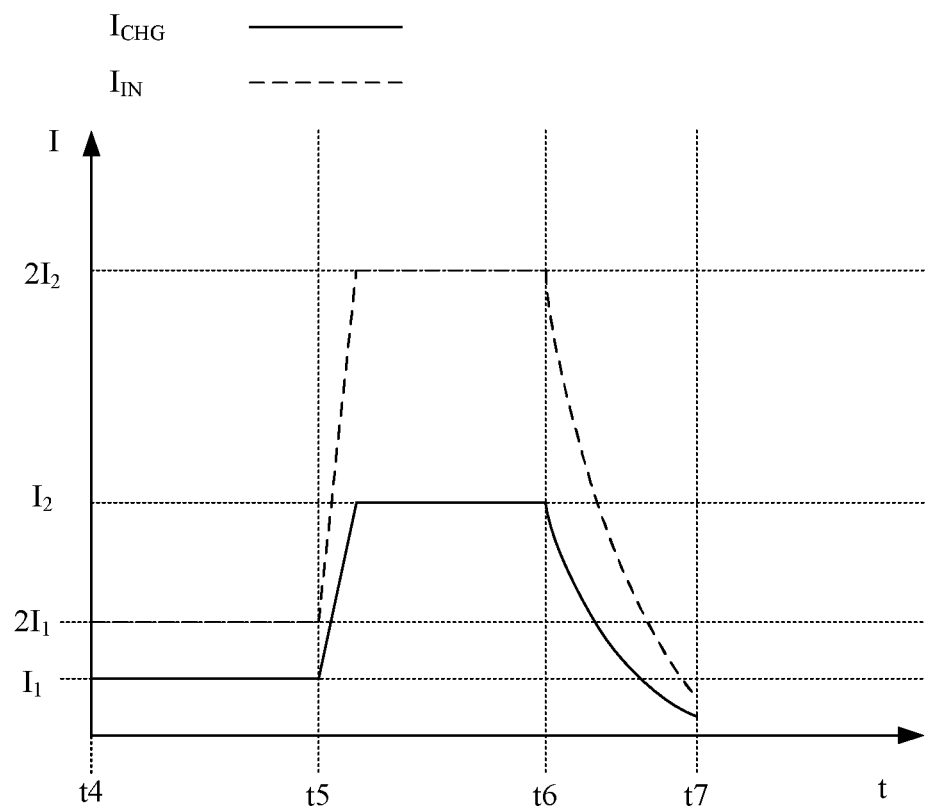
FIG. 6 is a waveform diagram of current in the battery charging curve, in accordance with embodiments of the present invention.

Referring now to FIG. 5, shown is a waveform diagram of voltage in the battery charging curve, in accordance with embodiments of the present invention. FIG. 5 also shows the changes of battery voltage $V_{BAT}$ and input voltage $V_{IN}$ during the charging process. Referring also to FIG. 6, shown is a waveform diagram of current in the battery charging curve, in accordance with embodiments of the present invention. FIG. 6 also shows the changes of charging current $I_{CHG}$ and input current $I_{IN}$ during the charging process.

For example, as shown in FIGS. 5 and 6, the battery may begin to be charged at time t4, and battery voltage $V_{BAT}$ can be less than predetermined threshold $V_{M1}$, such that control circuit 13 controls the battery to enter the trickle current mode, and the battery can be charged with constant current $I_1$. Thus, battery voltage $V_{BAT}$ may gradually increase. At time t5, battery voltage $V_{BAT}$ can increase to predetermined threshold $V_{M1}$, control circuit 13 can control the battery to enter the constant current mode, and may rapidly increase current $I_1$ to current $I_2$ to charge the battery. Thus, battery voltage $V_{BAT}$ may continue to increase. Since current $I_2$ is greater than current $I_1$, the increase rate of battery voltage $V_{BAT}$ after time t5 can be greater than that in time period t4-t5. At time t6, battery voltage $V_{BAT}$ may increase to predetermined threshold $V_{M2}$, control circuit 13 can control the battery to enter the constant voltage mode, and thus charging current $I_{CHG}$ may begin to decrease gradually. At time t7, charging current $I_{CHG}$ can decrease to be close to 0, and the charging process may end. In this way, battery charging can be achieved.

In one particular example, predetermined threshold $V_{M1}$ is 3V, predetermined threshold $V_{M2}$ is 4.2V, current $I_1$ is 0.1 A, and current $I_2$ is 1 A. When battery voltage $V_{BAT}$ is lower than 3V, trickle current charging may be adopted, and the charging current is 0.1 A. When battery voltage rises to 3V, the charging current can be increased for constant current charging, and the charging current is 1 A. Battery voltage $V_{BAT}$ gradually can increase in the constant current charging process. When battery voltage $V_{BAT}$ rises to 4.2V, the constant current charging may end and the constant voltage charging can begin. As the charging process continues, the charging current may gradually decrease from the maximum value, and when close to 0, charging process can end.

Figure 7:
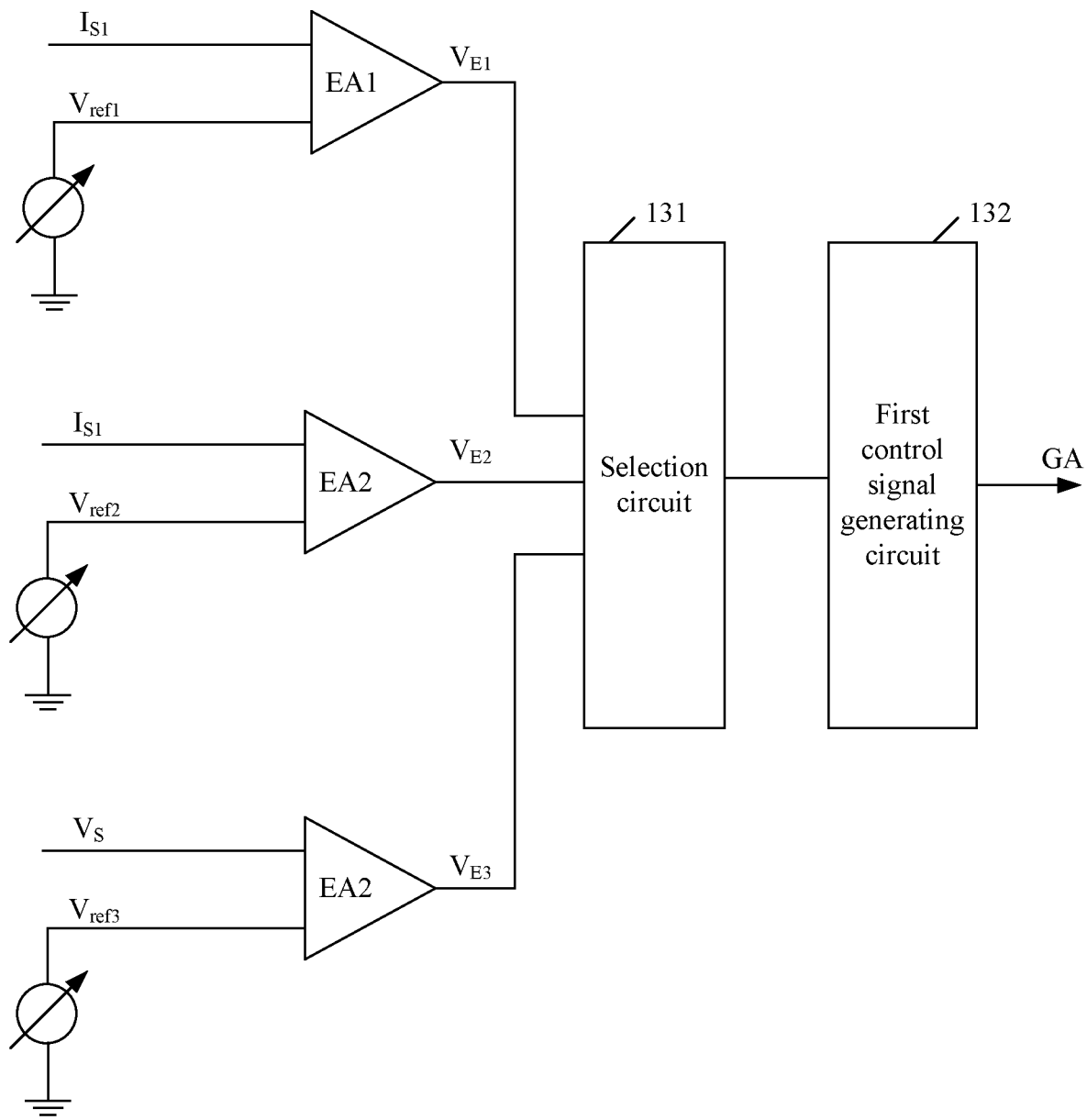
FIG. 7 is a schematic circuit diagram of an example control circuit, in accordance with embodiments of the preset invention.

Referring now to FIG. 7, shown is a schematic circuit diagram of an example control circuit, in accordance with embodiments of the preset invention. In this particular example, control circuit 13 can include amplifier EA1, amplifier EA2, amplifier EA3, selection circuit 131, and control signal generating circuit 132. Amplifier EA1 can obtain error signal $V_{E1}$ according to charging threshold $V_{ref1}$ and the current sampling signal. Amplifier EA2 may obtain error signal $V_{E2}$ according to charging threshold $V_{ref2}$ and the current sampling signal. Amplifier EA3 may obtain error signal $V_{E3}$ according to charging threshold $V_{ref3}$ and voltage sampling signal $V_S$. Selection circuit 131 can select and output one of error signals $V_{E1}$, $V_{E2}$, and $V_{E3}$ according to battery voltage $V_{BAT}$. Control signal generating circuit 132 can generate control signal GA according to the error signal output by selection circuit 131.

In this particular example, the non-inverting input terminal and the inverting input terminal of amplifier EA1 may respectively receive charging threshold $V_{ref1}$ and current sampling signal $I_{S1}$. Output terminal of amplifier EA1 can generate error signal $V_{E1}$ according to charging threshold $V_{ref1}$ and current sampling signal $I_{S1}$. For example, the non-inverting input terminal of amplifier EA1 can receive charging threshold $V_{ref1}$, and the inverting input terminal of amplifier EA1 can receive current sampling signal $I_{S1}$. Alternatively, the inverting input terminal of amplifier EA1 can receive charging threshold value $V_{ref1}$, and the non-inverting input terminal of amplifier EA1 can receive current sampling signal $I_{S1}$.

In this particular example, the non-inverting input terminal and the inverting input terminal of amplifier EA2 may respectively receive charging threshold $V_{ref2}$ and current sampling signal $I_{S1}$. Output terminal of second amplifier EA2 may generate error signal $V_{E2}$ according to charging threshold $V_{ref2}$ and current sampling signal $I_{S1}$. For example, the non-inverting input terminal of amplifier EA2 can receive charging threshold $V_{ref2}$, and the inverting input terminal of amplifier EA2 can receive current sampling signal $I_{S1}$. Alternatively, the inverting input terminal of amplifier EA2 can receive charging threshold $V_{ref2}$, and the non-inverting input terminal of amplifier EA2 can receive current sampling signal $I_{S1}$.

In this particular example, the non-inverting input terminal and the inverting input terminal of amplifier EA3 may respectively receive charging threshold $V_{ref3}$ and voltage sampling signal $V_S$. output terminal of amplifier EA3 can generate error signal $V_{E3}$ according to third charging threshold $V_{ref3}$ and voltage sampling signal $V_S$. For example, the non-inverting input terminal of amplifier EA3 can receive charging threshold $V_{ref3}$, and the inverting input terminal of amplifier EA3 can receive voltage sampling signal $V_S$. Alternatively, the inverting input terminal of amplifier EA3 can receive charging threshold $V_{ref3}$, and the non-inverting input terminal of amplifier EA3 can receive voltage sampling signal $V_S$.

in addition, the absolute values of charging thresholds $V_{ref1}$ and $V_{ref2}$ may not be equal. For example, the absolute value of charging threshold $V_{ref1}$ may be greater than the absolute value of charging threshold $V_{ref2}$, or the absolute value of charging threshold $V_{ref1}$ may be smaller than the absolute value of charging threshold $V_{ref2}$. In the trickle current mode, control circuit 13 can control linear regulator Qa according to the error signal output by the amplifier corresponding to the charging threshold with the smaller absolute value. In the constant current mode, control circuit 13 can control linear regulator Qa according to the error signal output by the amplifier corresponding to the charging threshold with a larger absolute value.

In this embodiment, selection circuit 131 can select and output one of error signals $V_{E1}$, $V_{E2}$, and $V_{E3}$ according to battery voltage $V_{BAT}$. For example, the first interval can be set as $V_{BAT}<V_{M1}$, the second interval can be set as $V_{M1}\leq V_{BAT}<V_{M2}$, and the third interval can be set as $V_{M2}=V_{BAT}$. When battery voltage $V_{BAT}$ is in the first interval, it can be determined that the charging mode of the battery is the trickle current mode, selection circuit 131 selects the error signal output by the amplifier with smaller absolute value of the charging threshold among amplifiers EA1 and EA2, and may output the error signal. When battery voltage $V_{BAT}$ is in the second interval, it can be determined that the charging mode of the battery is the constant current mode, selection circuit 131 may select the error signal output by the amplifier with larger absolute value of the charging threshold among amplifiers EA1 and EA2, and can output the error signal. When battery voltage $V_{BAT}$ is in the third interval, it can be determined that the charging mode of the battery is constant voltage mode, selection circuit 131 may select error signal $V_{E3}$ output by amplifier EA3. For example, when the absolute value of charging threshold $V_{ref1}$ is smaller than the absolute value of charging threshold $V_{ref2}$, and when battery voltage $V_{BAT}$ is in the first interval, it can be determined that the charging mode of the battery is the trickle current mode, and selection circuit 131 may select the error signal output by amplifier EA1.

When battery voltage $V_{BAT}$ is in the second interval, it can be determined that the charging mode of the battery is constant current mode, and selection circuit 131 may select the error signal output by amplifier EA2. When battery voltage $V_{BAT}$ is in the third interval, it can be determined that the charging mode of the battery is constant voltage mode, and selection circuit 131 may select the error signal output by amplifier EA3. For example, when the absolute value of charging threshold $V_{ref1}$ is greater than the absolute value of charging threshold $V_{ref2}$, and when battery voltage $V_{BAT}$ is in the first interval, it can be determined that the charging mode of the battery is the trickle current mode, and selection circuit 131 may select the error signal output by amplifier EA2. When battery voltage $V_{BAT}$ is in the second interval, it can be determined that the charging mode of the battery is constant current mode, and selection circuit 131 may select the error signal output by amplifier EA1. When battery voltage $V_{BAT}$ is in the third interval, it can be determined that the charging mode of the battery is constant voltage mode, and selection circuit 131 may select the error signal output by amplifier EA3. Charging thresholds $V_{ref1}$ and $V_{ref2}$ can be specifically set according to the first and second currents.

Therefore, selection circuit 131 can select the corresponding charging mode according to the battery voltage, and output the corresponding error signal, such that control signal generating circuit 132 can generate the first control signal according to the corresponding error signal, in order to control the charging circuit to work in the corresponding charging mode. In particular embodiments, control signal generating circuit 132 can generate the first control signal according to the error signal output by selection circuit 131. In addition, control signal generating circuit 132 may be implemented in any suitable manner. The charging circuit may utilize a charge pump to realize voltage-reduce and current-increase, and can generate the required charging voltage and charging current by adjusting the linear regulator. Therefore, when the difference between the input voltage provided by the input power supply and the battery voltage is too large, the input current can be reduced through the charge pump, thereby reducing the power consumption of the linear regulator.

Figure 8:
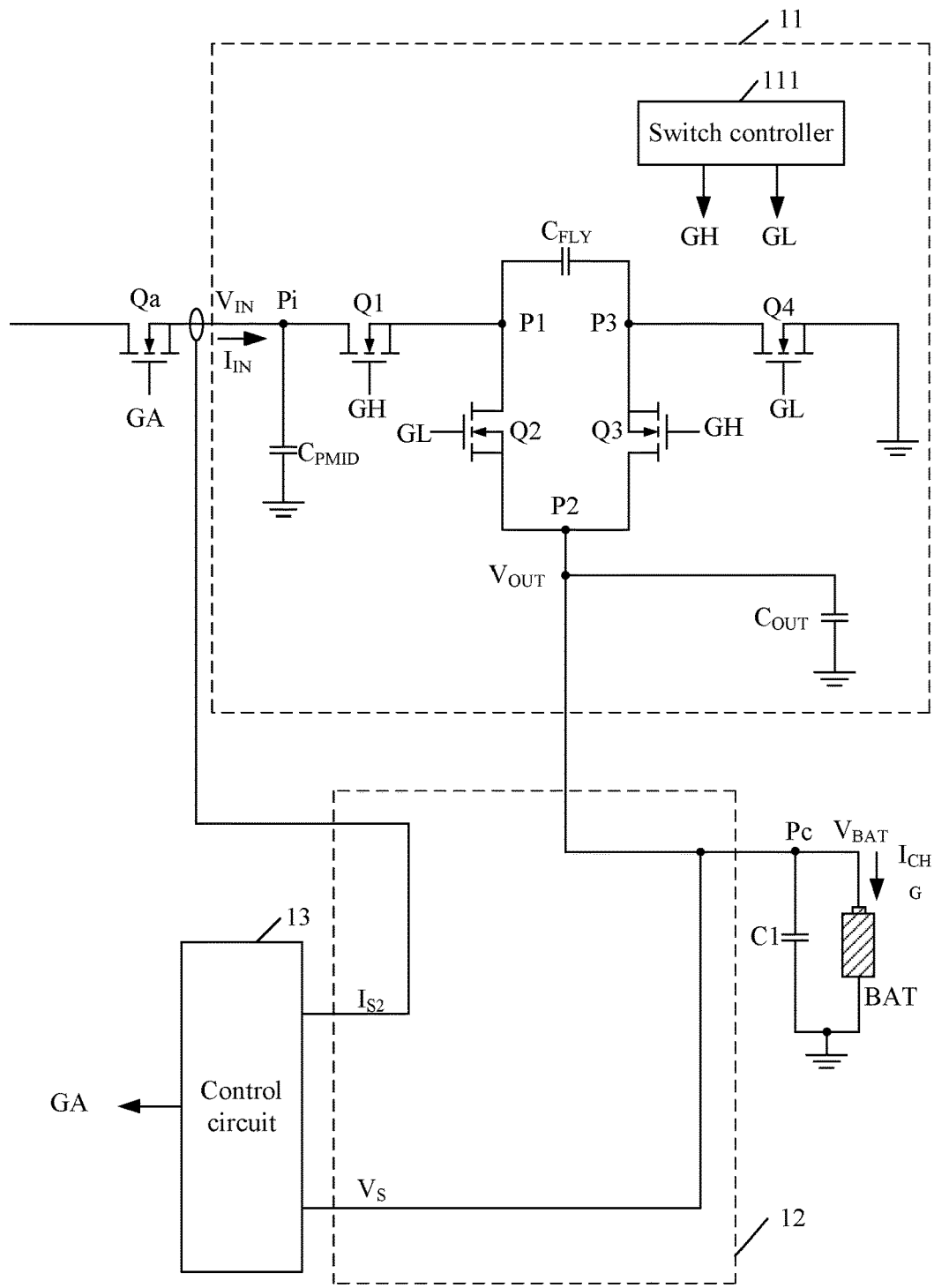
FIG. 8 is a schematic circuit diagram of a second example charging circuit, in accordance with embodiments of the preset invention.

Referring now to FIG. 8, shown is a schematic circuit diagram of a second example charging circuit, in accordance with embodiments of the preset invention. In this particular example the current sampling signal of the charging circuit is current sampling signal Isa. Also, current sampling signal $I_{S2}$ can characterize input current $I_{IN}$, and input current $I_{IN}$ may be the current flowing through linear regulator Qa. When the output terminal of the charge pump is not connected to sampling resistor Rs, charging current $I_{CHG}$ can be obtained according to input current $I_{IN}$ (e.g., $I_{CHG}=2I_{IN}$). Thus, the linear regulator Qa can be controlled by sampling the input current to achieve the same effect as FIG. 1. Further, with respect to FIG. 7, current sampling signal $I_{S1}$ may be replaced with current sampling signal $I_{S2}$, and both charging threshold $V_{ref1}$ and charging threshold $V_{ref2}$ corresponding to FIG. 8 can be half of those in FIG. 7.

Figure 9:
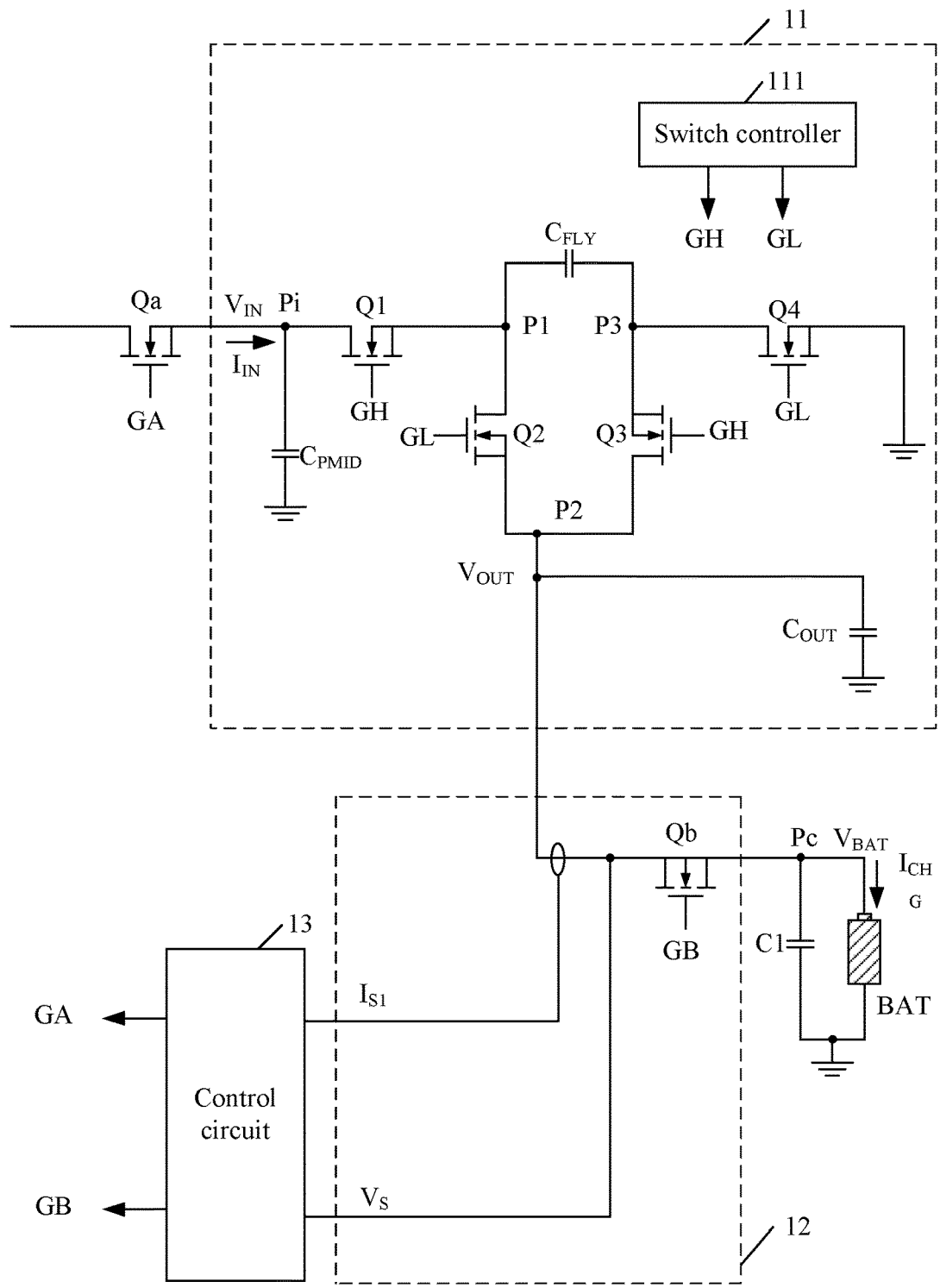
FIG. 9 is a schematic circuit diagram of a third example charging circuit, in accordance with embodiments of the preset invention.

Referring now to FIG. 9, shown is a schematic circuit diagram of a third example charging circuit, in accordance with embodiments of the preset invention. In this particular example, the sampling element of the charging circuit is power transistor Qb, and current sampling signal $I_{S1}$ obtained by the current sampling circuit may represent the current flowing through power transistor Qb, that is, the charging current. Voltage sampling signal $V_S$ can characterize output voltage $V_{OUT}$. In this particular example, power transistor Qb can be a MOSFET; however, other power transistors (e.g., bipolar transistors, insulated gate bipolar transistors, etc.) may also utilized in certain embodiments. In this embodiment, when the voltage of battery BAT may exceed the under-voltage threshold (e.g., predetermined threshold $V_{M1}$), power transistor Qb can be in a fully turn-on state, and control circuit 13 may I just linear regulator Qa according to the obtained current sampling signal $I_{S1}$ and the obtained voltage sampling signal $V_S$, such that the charging circuit operates in different charging modes. The control circuit can also control linear regulator Qa according to current sampling signal $I_{S2}$ and voltage sampling signal $V_S$.

In particular embodiments, by setting the sampling element as power transistor Qb, when the voltage of battery BAT is lower than the under-voltage threshold (e.g., predetermined threshold $V_{M1}$), power transistor Qb can be controlled by adjusting the driving voltage of power transistor Qb, in order to realize the charging of battery BAT. Also, the power supply to the downstream circuit connected to output terminal P2 can be ensured, in order to maintain normal operation of the downstream circuit. It should be understood that in a system whereby a downstream device is connected, when an external input source exists, the external input source can supply power to both battery BAT and the downstream device. When the external input source does not exist, battery BAT may supply power to the downstream device.

For example, when the battery voltage is lower than the under-voltage threshold (e.g., predetermined threshold $V_{M1}$), control circuit 13 can obtain voltage sampling signal Vs at output terminal P2 to control linear regulator Qa to adjust the output voltage of the charge pump, in order to supply power to battery BAT and downstream circuits. It should be understood that the minimum value of the output voltage can be equal to the supply voltage required by the downstream circuits, and the power supply voltage may be greater than the battery voltage at this time, but less than the battery voltage when the battery is fully charged. Control circuit 13 can also include another control signal generation circuit that may generate control signal GB in response to battery voltage $V_{BAT}$ being less than the under-voltage threshold to control power transistor Qb to operate in a voltage regulation mode. The driving voltage of power transistor Qb can be controlled to maintain a relatively small current to charge battery BAT with a constant current, in order to prevent the charging current of battery BAT from being too large due to the excessive voltage difference.

Further, the voltage regulation mode can be a low dropout regulator (LDO) mode. For example, when battery voltage $V_{BAT}$ is in a low voltage state (e.g., when battery voltage $V_{BAT}$ is less than the first predetermined threshold), power transistor Qb can be controlled to operate in LDO mode, the charging current may be relatively small, output voltage $V_{OUT}$ may simultaneously supply power to downstream circuits, and output voltage $V_{OUT}$>battery voltage $V_{BAT}$. As the charging progresses, battery voltage $V_{BAT}$ can gradually increase. When battery voltage $V_{BAT}$ is large enough (e.g., when battery voltage $V_{BAT}$ is greater than the under-voltage threshold), power transistor Qb may be fully turned on, and the power supply voltage of the downstream circuit can be equal to battery voltage $V_{BAT}$.

Figure 10:
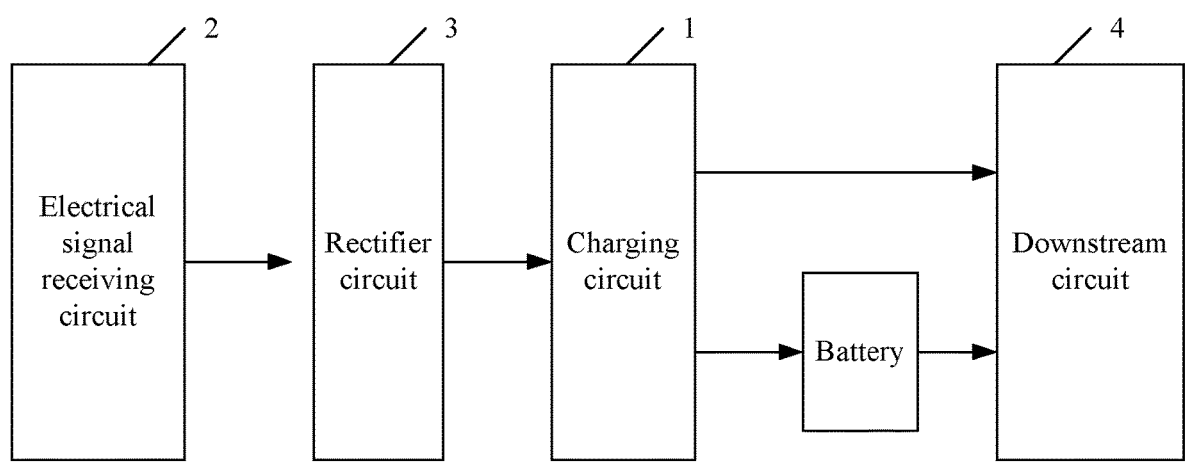
FIG. 10 is a schematic block diagram of an example charging device, in accordance with embodiments of the preset invention.

Referring now to FIG. 10, shown is a schematic block diagram of an example charging device, in accordance with embodiments of the preset invention. In this particular example, the charging device can include charging circuit 1, electrical signal receiving circuit 2, rectifier circuit 3, downstream circuit 4, and a battery. For example electrical signal receiving circuit 2 may receive external alternating current signals. Also, rectifier circuit 3 can rectify the external alternating current signal to generate a first electrical signal. Charging circuit 1 can charge the battery according to the first electrical signal, and also supply power to downstream circuit 4. Alternatively, electrical signal receiving circuit 2 can receive electrical signals in a wired manner. For example, electrical signal receiving circuit 2 can receive electrical signals output from a device such as a power adapter. In another alternative, electrical signal receiving circuit 2 can receive electrical signals wirelessly. For example, electrical signal receiving circuit 2 can receive electrical signals wirelessly output by a device, such as a wireless charger.

In this particular example, rectifier circuit 3 can rectify the external alternating current signal to generate the first electrical signal. For example, rectifier circuit 3 can be implemented in any suitable way, such as a full-bridge rectifier circuit or a half-bridge rectifier circuit. Usually, only when charging the battery wirelessly may be necessary to add a rectifier circuit to rectify the alternating current to the direct current. When charging the battery in a wired way, the signal output by the adapter can be a DC signal. In this example, charging circuit 1 can charge the battery according to the first electrical signal, and may supply power to downstream circuit 4. For example, the operating principle of the charging circuit can be as shown above in FIGS. 1 to 9.

Figure 11:
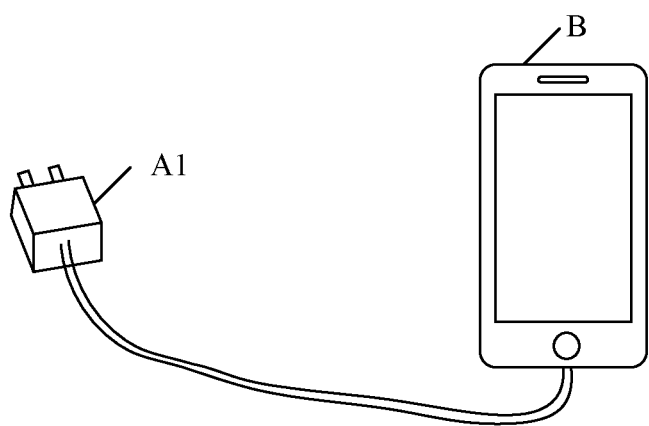
FIG. 11 is a schematic circuit diagram of a first example charging system, in accordance with embodiments of the preset invention.

Referring now to FIG. 11, shown is a schematic circuit diagram of a first example charging system, in accordance with embodiments of the preset invention. In this particular example, the charging system can include charger A1 and charging device B. For example, charger A1 can be a wired charger, which may transmit electrical signals in a wired manner. Also, charging device B can receive the electrical signal transmitted by charger A1 in a wired manner.

Figure 12:
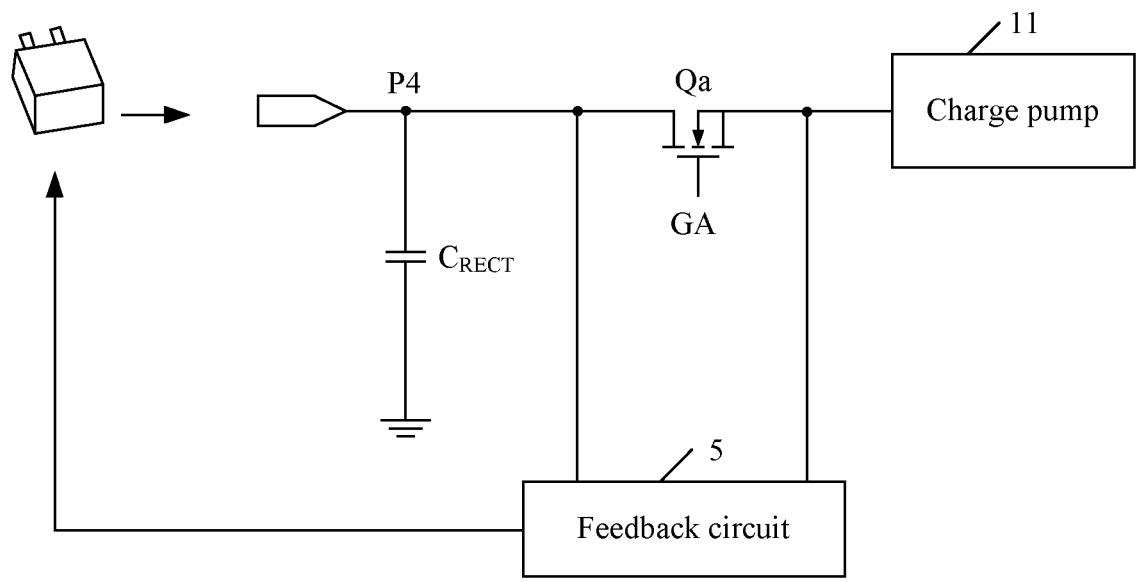
FIG. 12 is a schematic circuit diagram of a second example charging system, in accordance with embodiments of the preset invention.

Referring now to FIG. 12, shown is a schematic circuit diagram of a second example charging system, in accordance with embodiments of the preset invention. Referring also to FIG. 10, terminal P4 can connect to the output end of the rectifier circuit, and the charging device can also include capacitor $C_{RECT}$ and feedback circuit 5. For example, capacitor $C_{RECT}$ can connect between terminal P4 and the common terminal, and may filter the output signal of external input source input to linear regulator Qa. The two input ends of feedback circuits 5 can respectively connect to the two ends of linear regulator Qa for obtaining a feedback signal, and the feedback signal may represent the difference between the voltage drop across linear regulator Qa and the desired value of the voltage drop. In this example, with reference to FIGS. 11 and 12, the feedback signal obtained through feedback circuit 5 can be transmitted to charger A1, and charger A1 may adjust its output voltage that is output to charging device B according to the feedback signal, such that the voltage drop on linear regulator Qa is maintained at a small value (which just meets the loop regulation), which can further improve system efficiency.

Figure 13:
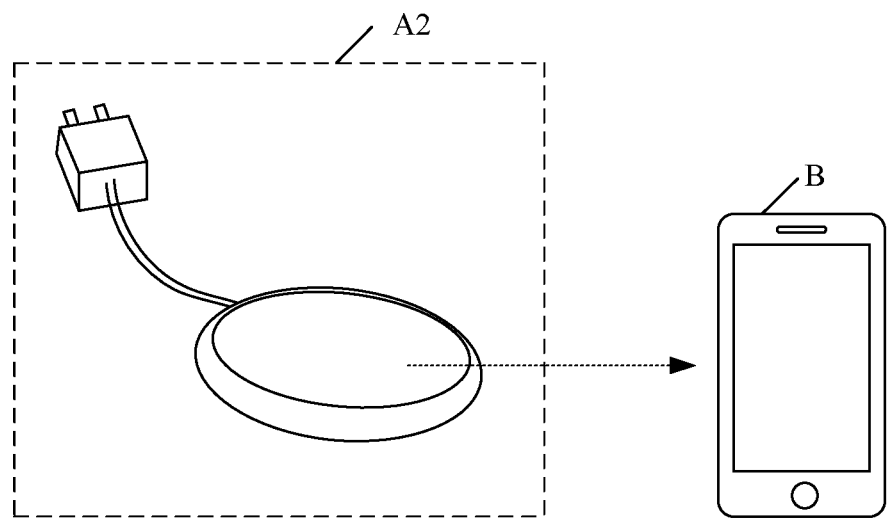
FIG. 13 is a schematic circuit diagram of a third example charging system, in accordance with embodiments of the preset invention.

Referring now to FIG. 13, shown is a schematic circuit diagram of a third example charging system, in accordance with embodiments of the preset invention. In this particular example, the charging system can include charger A2 and charging device B. For example, charger A2 is a wireless charger, which can transmit electrical signals in a wireless manner. Charging device B can wirelessly receive the electrical signal transmitted by charger A1. For example, charger A2 can receive 220V or 380V AC mains power, and may transmit electrical signals wirelessly through a wireless transmitting circuit. In this example, charging device B can include a wireless receiving circuit for wirelessly receiving the electrical signals transmitted by charger A2.

Figure 14:
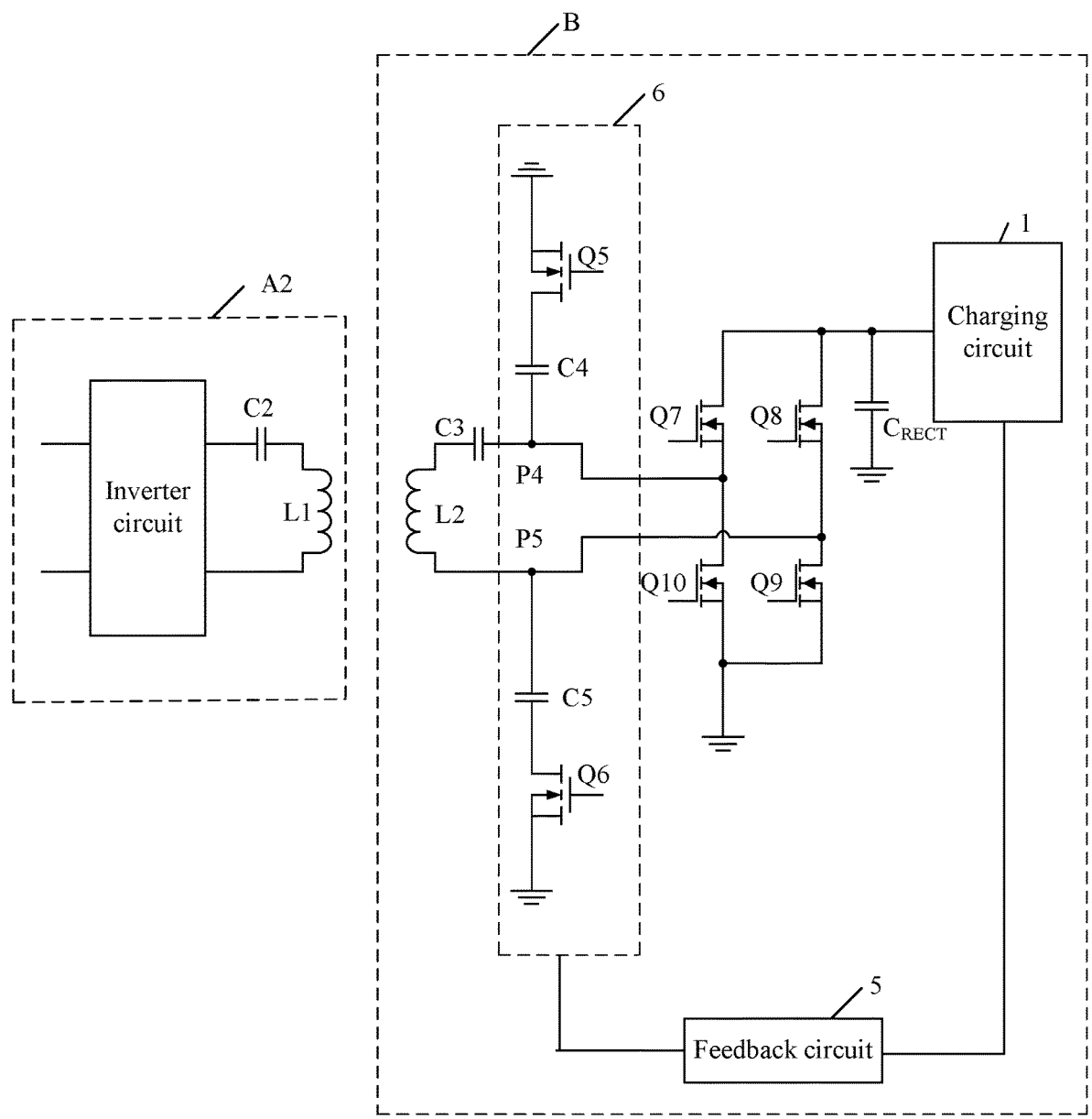
FIG. 14 is a schematic circuit diagram of a fourth example charging system, in accordance with embodiments of the preset invention.

Referring now to FIG. 14, shown is a schematic circuit diagram of a fourth example charging system, in accordance with embodiments of the preset invention. In this particular example, charger A2 can include an inverter circuit and a transmitter side circuit. For example, the inverter circuit can convert the input DC voltage into an alternating current (AC). The transmitting side circuit can include capacitor C2 and transmitting coil L1 connected in series with each other, and may transmit electric energy by electromagnetic induction at a certain operating frequency. In this example, charging device B can include receiving side circuit, rectifier circuit, feedback circuit 5, communication circuit 6, capacitor $C_{RECT}$, charging circuit 1, a battery, and a downstream circuit, with only the receiving side circuit, rectifier circuit, feedback circuit 5, communication circuit 6, capacitor $C_{RECT}$, and charging circuit are shown in FIG. 14. Further, the receiving side circuit can include receiving coil L2 and capacitor C3 connected in series with each other, for receiving the electric energy transmitted by the transmitting side circuit.

The rectifier circuit can include switches Q7, Q8, Q9, and Q10. Switches Q7, Q8, Q9, and Q10 may form a full-bridge rectifier circuit to rectify the electrical signal received by the receiving side circuit, and the rectified signal can be filtered by capacitor $C_{RECT}$ and then output to charging circuit 1. Charging circuit 1 can charge the battery according to the received electrical signal and may also supply power to the downstream circuit at the same time. The rectifier circuit may alternatively or additionally include other suitable rectifier circuits composed of multiple diodes and/or controlled switches (e.g., a full-bridge rectifier circuit or a half-bridge rectifier circuit). In this example, feedback circuit 5 can obtain a feedback signal, where the feedback signal represents a difference between the voltage drop on linear regulator Qa and the desired value of the voltage drop.

Communication circuit 6 can include capacitor C4, capacitor C5, switch Q5, and switch Q6. Capacitor C4 can connect in series with switch Q5 to form a first series circuit, capacitor C5 can connect in series with switch Q6 to form a second series circuit, and the two series circuits may respectively connect to the two output ends of the receiving side circuit. Feedback circuit 5 can transmit the feedback signal to communication circuit 6, and communication circuit 6 can control switches Q5 and Q6 to be turned on and off, thereby changing the load of the charging device. After the load of the charging device changes, the voltage on coil L1 of charger A2 may change. The inverter circuit can obtain a first feedback signal according to the change of voltage on coil L1 after decoding. The output power of the transmitting side circuit may be adjusted according to the first feedback signal, in order to make the electrical energy received by the charging device change. This can thereby change the voltage input to linear regulator Qa in charging circuit 1, and make the voltage drop of linear regulator Qa approach the desired value, thereby reducing the power consumption of linear regulator Qa and increasing the system efficiency. Therefore, linear regulator Qa can stabilize the input voltage of the charge pump in this example, and may also be used to feed back the required output voltage to the charger.

In particular embodiments, a charge pump can be utilized to realize voltage-reduce and current-increase, and may generate the required charging voltage and charging current by adjusting the linear regulator. Therefore, when the difference between the input voltage provided by the input power supply and the battery voltage is too large, the input current can be reduced through the charge pump, thereby reducing the power consumption of the linear regulator.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A charging circuit, comprising:
   a) a linear regulator configured to receive an external input source;
   b) a charge pump coupled between the linear regulator and a charging terminal, wherein the charging terminal is coupled to a battery;
   c) a control circuit configured to generate a first control signal according to a current sampling signal representing a charging current of the battery and a voltage sampling signal representing a charging voltage of the battery, in order to control the linear regulator, such that at least one of the charging current and the charging voltage meet charging requirements; and
   d) wherein the charge pump comprises a first capacitor coupled between an output terminal of the linear regulator and a common terminal, a first switch coupled between the output terminal of the linear regulator and a first terminal, a second switch coupled between the first terminal and a second terminal, a third switch coupled between the second terminal and a third terminal, a fourth switch coupled between the third terminal and the common terminal, a second capacitor coupled between the first terminal and the third terminal, a third capacitor coupled between the second terminal and the common terminal, and a switch controller configured to control the first switch, the second switch, the third switch and the fourth switch to be turned on or off, wherein the second terminal is the output terminal of the charge pump.

2. The charging circuit of claim 1, wherein an output voltage of the charge pump is equal to 1/N of an input voltage of the charge pump, an output current of the charge pump is N times an input current of the charge pump, and N is a positive integer greater than 1.

3. The charging circuit of claim 1, wherein:
   a) the current sampling signal is configured as one of a first current sampling signal and a second current sampling signal; and
   b) the first current sampling signal is configured to represent the charging current, the second current sampling signal is configured to an input current of the charge pump, and the charging current is positively correlated to an output current of the charge pump.

4. The charging circuit of claim 1, wherein the charging circuit further comprises:
   a) a voltage sampling circuit configured to acquire the voltage sampling signal; and
   b) a current sampling circuit configured to acquire the current sampling signal.

5. The charging circuit of claim 4, wherein the current sampling circuit comprises:
   a) a sampling element coupled between an output terminal of the charge pump and the charging terminal; and
   b) a transconductance amplifier coupled to both ends of the sampling element, for acquiring the current sampling signal according to a voltage across the sampling element.

6. The charging circuit of claim 5, wherein the sampling element comprises a resistor.

7. The charging circuit of claim 5, wherein the sampling element comprises a power transistor.

8. The charging circuit of claim 1, wherein:
   a) the control circuit is configured to control an output voltage or an output current of the linear regulator according to a battery voltage of the battery, such that the battery is charged in different charging modes;
   b) the charging modes comprises a trickle current mode, a constant current mode, and a constant voltage mode;
   c) in the trickle current mode, the battery is charged with a constant first current, in the constant current mode, and the battery is charged with a constant second current; and
   d) in the constant voltage mode, the battery is charged with a constant voltage, and the first current is smaller than the second current.

9. The charging circuit of claim 8, wherein the control circuit is configured to select an error signal among different error signals according to the battery voltage to control operating states of the linear regulator, and the error signal is generated according to the current sampling signal or the voltage sampling signal and a corresponding charging threshold.

10. The charging circuit of claim 9, wherein the control circuit comprises:
    a) a first amplifier configured to obtain a first error signal according to a first charging threshold and the current sampling signal;
    b) a second amplifier configured to obtain a second error signal according to a second charging threshold and the current sampling signal;
    c) a third amplifier configured to obtain a third error signal according to a third charging threshold and the voltage sampling signal;
    d) a selection circuit configured to select and output one of the first error signal, the second error signal and the third error signal according to the battery voltage;
    e) a first control signal generating circuit configured to generate the first control signal according to an error signal output by the selection circuit; and
    f) wherein the second charging threshold is not equal to the first charging threshold.

11. The charging circuit of claim 10, wherein:
    a) when the battery voltage is less than a first predetermined threshold, the selection circuit selects and outputs the first error signal, such that the first control signal generating circuit controls the battery to operate in the trickle current mode according to the first error signal;
    b) when the battery voltage is greater than or equal to the first predetermined threshold and less than a second predetermined threshold, the selection circuit selects and outputs the second error signal, such that the first control signal generating circuit controls the battery to operate in the constant current mode according to the second error signal; and
    c) when the battery voltage is equal to the second predetermined threshold, the selection circuit selects and outputs the third error signal, such that the first control signal generating circuit controls the battery to operate in the constant voltage mode according to the third error signal.

12. The charging circuit of claim 7, wherein when the sampling element is a power transistor, the control circuit further comprises a second control signal generating circuit, wherein:
    a) the second control signal generating circuit is configured to generate a second control signal when the battery voltage is less than an under-voltage threshold, in order to control the power transistor to operate in a voltage regulation mode to adjust the charging current, an output voltage of the charge pump is controlled to supply power to a downstream circuit of the battery, and the output voltage of the charge pump is greater than the battery voltage and meets an supply voltage of the downstream circuit; and
    b) the second control signal generating circuit is configured to generate a third control signal when the battery voltage is greater than the under-voltage threshold, in order to control the power transistor to be fully turned on, such that the output voltage of the charge pump charges the battery and supplies power to the downstream circuit, and the battery voltage is equal to the supply voltage of the downstream circuit.

13. The charging circuit of claim 1, wherein the switch controller is configured to control the first switch and the third switch to be turned on or off synchronously, and control the second switch and the fourth switch to turn on or off synchronously in an opposite manner.

14. A charging device, comprising the charging circuit of claim 1, and further:
    a) an electrical signal receiving circuit configured to receive an external electrical signal; and
    b) a rectifier circuit configured to rectify the external electrical signal to generate a first electrical signal as the external input source.

15. The charging device of claim 14, further comprising a fourth capacitor coupled between an output terminal of the rectifier circuit and a common terminal, and being configured to filter the first electrical signal.

16. The charging device of claim 14, wherein the electrical signal receiving circuit is configured to receive the external electrical signal in a wired manner.

17. The charging device of claim 14, wherein the electrical signal receiving circuit is configured to receive the external electrical signal in a wireless manner.

18. The charging device of claim 14, wherein the charging device further comprises:
    a) a feedback circuit configured to obtain a feedback signal for characterizing a difference between a voltage drop of the linear regulator and a desired value of the voltage drop; and b) a communication circuit configured to transmit the feedback signal for adjusting a received external electrical signal.

\* \* \* \* \*